US009332445B2

(12) United States Patent
Han

(10) Patent No.: US 9,332,445 B2
(45) Date of Patent: May 3, 2016

(54) COORDINATED PROCESSING METHOD AND SYSTEM FOR NORTHBOUND DATA CONFIGURATION AND SELF-ORGANIZED NETWORK CONFIGURATION

(75) Inventor: Xiaoqin Han, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 193 days.

(21) Appl. No.: 14/355,257

(22) PCT Filed: Jun. 26, 2012

(86) PCT No.: PCT/CN2012/077536
§ 371 (c)(1),
(2), (4) Date: Jun. 18, 2014

(87) PCT Pub. No.: WO2013/063943
PCT Pub. Date: May 10, 2013

(65) Prior Publication Data
US 2014/0293831 A1    Oct. 2, 2014

(30) Foreign Application Priority Data

Nov. 2, 2011  (CN) .......................... 2011 1 0342337

(51) Int. Cl.
*H04L 12/28*      (2006.01)
*H04W 24/02*     (2009.01)
*H04L 12/24*      (2006.01)

(52) U.S. Cl.
CPC ........... *H04W 24/02* (2013.01); *H04L 41/0863* (2013.01); *H04L 41/0866* (2013.01); *H04L 41/0883* (2013.01)

(58) Field of Classification Search
CPC ............ H04L 41/0863; H04L 41/0866; H04L 41/0883; H04W 24/02
See application file for complete search history.

(56) References Cited

U.S. PATENT DOCUMENTS

| 2011/0009105 A1* | 1/2011 | Lee ...................... H01Q 9/0407 455/418 |
| 2011/0053601 A1* | 3/2011 | Frederiksen ........ H04J 11/0093 455/447 |
| 2011/0105139 A1* | 5/2011 | On ........................ H04W 16/10 455/453 |

FOREIGN PATENT DOCUMENTS

| CN | 101998456 A | 3/2011 |
| WO | 2010086028 A1 | 8/2010 |

(Continued)

OTHER PUBLICATIONS
International Search Report for PCT/CN2012/077536 dated Sep. 12, 2012.

(Continued)

*Primary Examiner* — Minh-Trang Nguyen
(74) *Attorney, Agent, or Firm* — Ling Wu; Stephen Yang; Ling and Yang Intellectual Property

(57) ABSTRACT

A coordinated processing method and system for northbound data configuration and self-organized network configuration, the method includes: a northbound configuration module sending a data configuration request and an SON function management module sending a parameter optimization request to a conflict resolution module; the conflict resolution module receiving the requests, and if judging that the parameter requested by the northbound configuration module to be configured conflicts with the parameter requested by the SON function management module to be configured, then sending a conflict judgment message indicating conflict to the northbound configuration module and the SON function management module; after receiving the message, the northbound configuration module performing data configuration in the data configuration request and reporting conflict information to a superior network management; after receiving the message, the SON function management module notifying the SON function module to perform parameter rollback and/or end a current self-optimization procedure.

20 Claims, 6 Drawing Sheets

(56) References Cited

FOREIGN PATENT DOCUMENTS

| WO | 2010104977 A1 | 9/2010 |
| WO | 2010140057 A1 | 12/2010 |

OTHER PUBLICATIONS

A Coordination Framework for Self-Organisation in LTE Networks. 12th IFIP International Symposium on Integrated Network Management 2011. Lars Chistoph Schmelz et al. XP 0032035479A.

Clarify and refine objectives of Self optimization coordination; 3GPP TSG-SA5 (Telecom Management); Meeting SA5#71, May 10-14, 2010, Montreal, Quebec, Canada; Ericsson; S5-101216.

Coordination between IRPAgent and IRPManager for SON parameter configuration; SA5 Meeting #67, Vancouver, Canada, Aug. 31-Sep. 4, 2009 Agenda item: 6.5 Source: Qualcomm Europe; S5-093453.

Handling of attribute ranges at domain borders for SON coordination; 3GPP TSG-SA5 (Telecom Management); Oct. 10-14, 2011; Nanjing, P. R. China; Nokia Siemens Networks; S5-113020.

* cited by examiner

COORDINATED PROCESSING METHOD AND SYSTEM FOR NORTHBOUND DATA CONFIGURATION AND SELF-ORGANIZED NETWORK CONFIGURATION

TECHNICAL FIELD

The present document relates to the wireless communication field, and in particular, to a coordinated processing method and system for northbound data configuration and self-organized network (SON) configuration in the third generation mobile communication long term evolution (3GPP LTE) system.

BACKGROUND OF THE RELATED ART

The concept of SON is introduced in the LTE, that is, the network can configure the network parameter automatically and can adjust the relevant wireless parameter automatically according to the variation of the network performance during the network operation process to make the network run in a better state all the time, so as to reduce the manual intervention and decrease the cost of operation and maintenance. But during the network operation process, the operation and maintenance personnel may modify the relevant wireless parameter by means of a network management of the upper layer setting manually, and at the same time, if in a situation that the SON function is enabled, the SON function also may modify relevant wireless parameters automatically, if now the manually setting parameters are the same as the parameters optimized by the SON function while the contents are different, a conflict may occur.

SUMMARY OF THE INVENTION

The technical problem required to be solved by the present document is to provide a coordinated processing method and system for northbound data configuration and self-organized network (SON) configuration, which solves the problem of the conflict between the northbound data configuration and the SON configuration.

In order to solve the above-mentioned problem, the present document provides a coordinated processing method for northbound data configuration and self-organized network (SON) configuration, comprising:

a northbound configuration module receiving a data configuration request sent by a superior network management, and sending the data configuration request to a conflict resolution module;

an SON function management module receiving a parameter optimization request sent by an SON function module, and sending the parameter optimization request to the conflict resolution module;

the conflict resolution module receiving the data configuration request sent by the northbound configuration module and the parameter optimization request sent by the SON function management module, and if judging that a parameter requested by the northbound configuration module to be configured conflicts with a parameter requested by the SON function management module to be configured, then sending a conflict judgment message indicating conflict to the northbound configuration module and the SON function management module respectively;

after receiving the conflict judgment message indicating conflict sent by the conflict resolution module, the northbound configuration module performing data configuration in the data configuration request and reporting conflict information to the superior network management; and after receiving the conflict judgment message indicating conflict sent by the conflict resolution module, the SON function management module notifying the SON function module to perform parameter rollback and/or end a current self-optimization procedure.

Preferably, the data configuration request comprises an identification of the parameter to be configured and a modification value.

Preferably, the parameter optimization request comprises a name of an SON function module indicating parameter configuration, an identification of the parameter to be configured and a modification value.

Preferably, the conflict resolution module judging that a parameter requested by the northbound configuration module to be configured conflicts with a parameter requested by the SON function management module to be configured, comprises:

the conflict resolution module judging that an identification of the parameter requested by the northbound configuration module to be configured and an identification of the parameter requested by the SON function management module to be configured are same while modification values are different, then judging that the conflict occurs.

Preferably, the conflict judgment message sent by the conflict resolution module to the northbound configuration module comprises an identification of a parameter indicating conflict, a name of an SON function module causing the conflict, and a modification value configured by the SON function module.

Preferably, the conflict judgment message sent by the conflict resolution module to the SON function management module comprises an identification of a parameter indicating conflict, and a parameter value configured by the northbound configuration module.

Preferably, after receiving the conflict judgment message sent by the conflict resolution module, the SON function management module notifying the SON function module to perform parameter rollback and/or end a current self-optimization procedure, comprises:

for a self-optimization procedure in a controlled mode performed by a network management, the SON function management module sending a notification indicating conflict to the SON function module after receiving the conflict judgment message indicating conflict sent by the conflict resolution module, and the SON function module ending the current self-optimization procedure; or for a self-optimization procedure in a free mode performed by a network management, the SON function management module sending a notification indicating conflict to the SON function module after receiving the conflict judgment message indicating conflict sent by the conflict resolution module, and the SON function module performing the parameter rollback and synchronizing the parameter to a network element after finishing the parameter rollback; or for a self-optimization procedure in a controlled mode performed by a network element, the SON function management module sending a notification indicating conflict to the SON function module after receiving the conflict judgment message indicating conflict sent by the conflict resolution module, and the SON function module ending the current self-optimization procedure and notifying the network element performing the self-optimization procedure to end the current self-optimization procedure; or for a self-optimization procedure in a free mode performed by a network element, the SON function management module sending a notification indicating conflict to the SON function module after receiving the conflict judgment message indicating conflict sent by the conflict resolution module, and the SON function module ending the current self-optimization procedure and notifying the network element performing the self-optimization procedure to perform the parameter rollback.

Preferably, the method further comprises:

the conflict resolution module receiving the data configuration request sent by the northbound configuration module and the parameter optimization request sent by the SON function management module, and if judging that the parameter requested by the northbound configuration module to be configured does not conflict with the parameter requested by the SON function management module to be configured, then sending a conflict judgment message indicating non-conflict to the SON function management module; and the SON function management module sending a notification indicating non-conflict to the SON function module after receiving the conflict judgment message indicating non-conflict sent by the conflict resolution module, and the SON function module continuing performing the self-optimization procedure.

In order to solve the above-mentioned problem, the present document further provides a coordinated processing system for northbound data configuration and self-organized network (SON) configuration, comprising a northbound configuration module, an SON function module, an SON function management module, and a conflict resolution module, wherein, the northbound configuration module is configured to receive a data configuration request sent by a superior network management and send the data configuration request to the conflict resolution module; and after receiving a conflict judgment message indicating conflict sent by the conflict resolution module, perform data configuration in the data configuration request and report conflict information to the superior network management;

the SON function module is configured to send a parameter optimization request to the SON function management module, and perform parameter rollback and/or end a current self-optimization based on a notification of the SON function management module;

the SON function management module is configured to receive the parameter optimization request sent by the SON function module and send the parameter optimization request to the conflict resolution module; and after receiving the conflict judgment message indicating conflict sent by the conflict resolution module, notify the SON function module to perform the parameter rollback and/or end a current self-optimization procedure.

the conflict resolution module is configured to receive the data configuration request sent by the northbound configuration module and the parameter optimization request sent by the SON function management module, and if judging that a parameter requested by the northbound configuration module to be configured conflicts with a parameter requested by the SON function management module to be configured, then send the conflict judgment message indicating conflict to the northbound configuration module and the SON function management module respectively.

Preferably, the data configuration request comprises an identification of the parameter to be configured and a modification value.

Preferably, the parameter optimization request comprises a name of an SON function module indicating parameter configuration, an identification of the parameter to be configured and a modification value.

Preferably, the conflict resolution module is configured to judge that a parameter requested by the northbound configuration module to be configured conflicts with a parameter requested by the SON function management module to be configured by means of:

the conflict resolution module judging that an identification of the parameter requested by the northbound configuration module to be configured and an identification of the parameter requested by the SON function management module to be configured are same while modification values are different, then determining that the conflict occurs.

Preferably, the conflict judgment message sent by the conflict resolution module to the northbound configuration module comprises an identification of a parameter indicating conflict, a name of an SON function module causing the conflict, and a modification value configured by the SON function module.

Preferably, the conflict judgment message sent by the conflict resolution module to the SON function management module comprises an identification of a parameter indicating conflict, and a parameter value configured by the northbound configuration module.

Preferably, the SON function management module is configured to: notify the SON function module to perform the parameter rollback and/or end the current self-optimization procedure after receiving the conflict judgment message indicating conflict sent by the conflict resolution module by means of:

for a self-optimization procedure in a controlled mode performed by a network management, or a self-optimization procedure in a free mode performed by the network management, or a self-optimization procedure in a controlled mode performed by a network element, or a self-optimization procedure in a free mode performed by the network element, the SON function management module sending a notification indicating conflict to the SON function module after receiving the conflict judgment message indicating conflict sent by the conflict resolution module;

the SON function module is configured to: perform the parameter rollback and/or end the current self-optimization based on the notification of the SON function management module by means of:

for the self-optimization procedure in the controlled mode performed by the network management, the SON function module ending the current self-optimization procedure after receiving the notification indicating conflict sent by the SON function management module; or for the self-optimization procedure in the free mode performed by the network management, the SON function management module performing the parameter rollback and synchronizing the parameter to the network element after receiving the notification indicating conflict sent by the SON function management module; or for the self-optimization procedure in the controlled mode performed by the network element, after receiving the notification indicating conflict sent by the SON function management module, the SON function module ending the current self-optimization procedure, sending a message to a network element performing the self-optimization to notify the network element to end the self-optimization procedure; or for the self-optimization procedure in the free mode performed by the network element, after receiving the notification indicating conflict sent by the SON function management module, the SON function module ending the current self-optimization procedure, sending a message to a network element performing the self-optimization to notify the network element to perform the parameter rollback.

Preferably, the conflict resolution module is further configured to send a conflict judgment message indicating non-conflict to the SON function management module if judging that the parameter requested by the northbound configuration module to be configured does not conflict with the parameter requested by the SON function management module to be configured;

the SON function management module is further configured to send a notification indicating non-conflict to the SON function module after receiving the conflict judgment message indicating non-conflict sent by the conflict resolution module; and the SON function module is further configured to continue performing the self-optimization procedure after receiving the notification indicating non-conflict sent by the SON function management module.

PREFERRED EMBODIMENTS OF THE INVENTION

When a manually set parameter is the same with a parameter optimized by the SON function but the contents thereof are different, the preferential effective mode of the parameter needs to be considered. Considering that the SON is a continuous optimization process, and the automatic optimization of the parameter is performed through the algorithm by relying on a large amount of data (including performance data, detection data of a UE and some associated signaling), and there may be errors; usually, the influence caused by modifying the parameter will be known when setting manually, which is targeted, therefore the present document proposes that: when the northbound configuration conflicts with the configuration caused by the SON function, it is subject to the northbound configuration data, so as to prevent the conflict between the northbound data configuration and the SON configuration. The information, such as the name of the parameter for conflict, the SON function name, the optimized target value of the SON function, etc. is returned to the upper layer network management through the northbound interface, so that the upper layer network management performs the management.

The embodiments of the present document are described in detail with reference to the accompanying drawings hereinafter. It should be illustrated that, in the case of not conflicting, the embodiments in the present application and features in these embodiments can be combined with each other.

Embodiment 1

Figure 1:
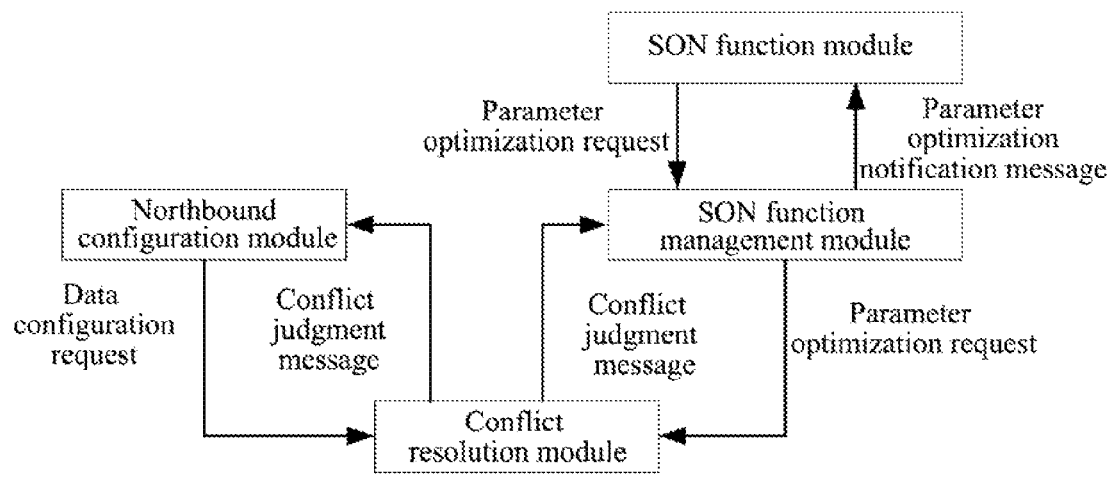
FIG. 1 is a structure diagram of a coordinated processing system for northbound configuration and self-organized network (SON) function configuration according to embodiment 1 of the present document.

As shown in FIG. 1, the system realizing conflict resolution includes a northbound configuration module, an SON function module, an SON function management module, and a conflict resolution module, wherein, the northbound configuration module is configured to receive a data configuration request sent by a superior network management and send the data configuration request to the conflict resolution module; and after receiving a conflict judgment message indicating conflict sent by the conflict resolution module, perform data configuration in the data configuration request and report conflict information to the superior network management;

the SON function management module is configured to receive the parameter optimization request sent by the SON function module and send the parameter optimization request to the conflict resolution module; and after receiving the conflict judgment message indicating conflict sent by the conflict resolution module, notify the SON function module to perform parameter rollback and/or end a current self-optimization procedure.

The SON function module is configured to send a parameter optimization request to the SON function management module (for example, the SON function module receives fault message reported by a network element, determines a parameter required to be optimized and an optimization value according to an algorithm, and sends the parameter optimization request to the SON function management module), and perform parameter rollback and/or end a current self-optimization based on a notification of the SON function management module;

the conflict resolution module is configured to receive the data configuration request sent by the northbound configuration module and the parameter optimization request sent by the SON function management module, and if judging that a parameter requested by the northbound configuration module to be configured conflicts with a parameter requested by the SON function management module to be configured, then send the conflict judgment message indicating conflict to the northbound configuration module and the SON function management module respectively.

The above-mentioned data configuration request includes an identification of the parameter to be configured and a modification value. The parameter optimization request includes a name of an SON function module indicating parameter configuration, an identification of the parameter to be configured and a modification value.

Preferably, the conflict resolution module is configured to judge that a parameter requested by the northbound configuration module to be configured conflicts with a parameter requested by the SON function management module to be configured by adopting the following mode:

the conflict resolution module judging that an identification of the parameter requested by the northbound configuration module to be configured and an identification of the parameter requested by the SON function management module to be configured are same while modification values are different, then determining that the conflict occurs.

Preferably, the conflict judgment message sent by the conflict resolution module to the northbound configuration module comprises an identification of a parameter indicating conflict, a name of an SON function module causing the conflict, and a modification value configured by the SON function module. The conflict judgment message sent by the conflict resolution module to the SON function management module includes an identification of a parameter indicating conflict, and a parameter value configured by the northbound configuration module.

Embodiment 2

Figure 2:
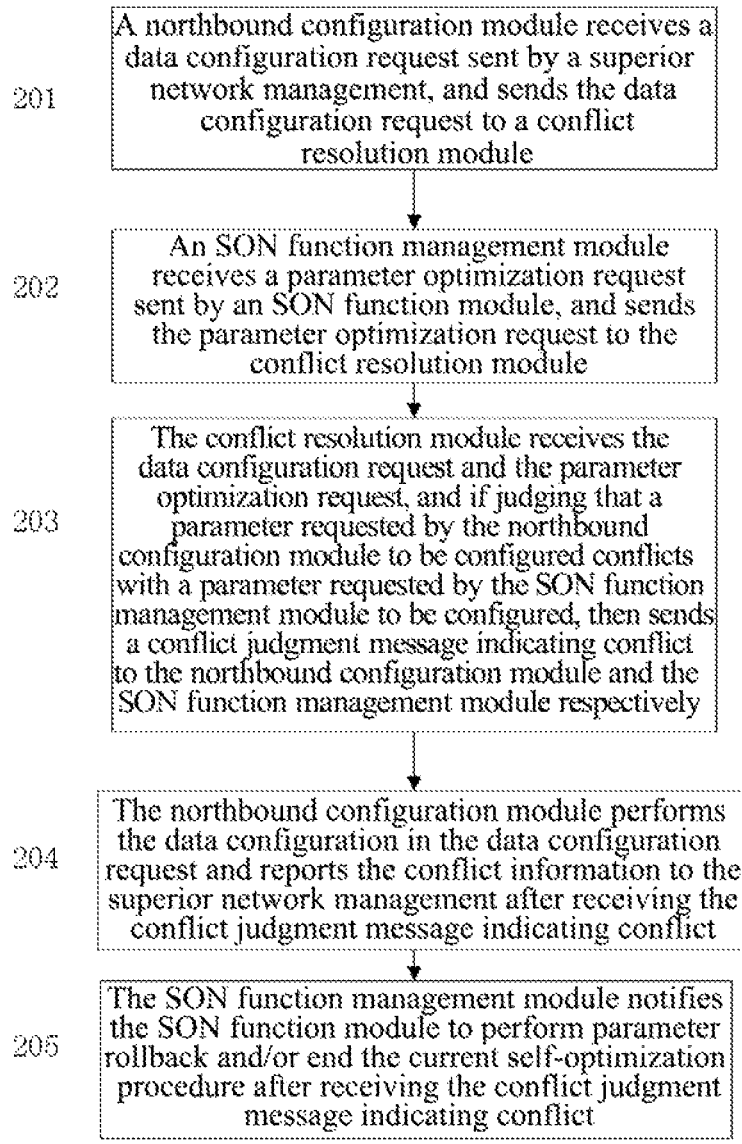
FIG. 2 is a flow chart according to embodiment 2 of the present document.

The present embodiment introduces the coordinated processing for the northbound data configuration and the SON configuration realized by the system in embodiment 1, as shown in FIG. 2, including the following steps:

in step 201, a northbound configuration module receives a data configuration request sent by a superior network management, and sends the data configuration request to a conflict resolution module.

The data configuration request includes an identification of the parameter to be configured and a modification value.

In step 202, an SON function management module receives a parameter optimization request (also can be called as an SON configuration request) sent by an SON function module, and sends the parameter optimization request to the conflict resolution module.

The parameter optimization request comprises a name of an SON function module indicating parameter configuration, an identification of the parameter to be configured and a modification value.

There is no fixed sequential order for the above-mentioned step 201 and step 202.

In step 203, the conflict resolution module receives the data configuration request sent by the northbound configuration module and the parameter optimization request sent by the SON function management module, and if judging that a parameter requested by the northbound configuration module to be configured conflicts with a parameter requested by the SON function management module to be configured, then sends a conflict judgment message indicating conflict to the northbound configuration module and the SON function management module respectively.

If the conflict resolution module judges that an identification of the parameter requested by the northbound configuration module to be configured and an identification of the parameter requested by the SON function management module to be configured are same while modification values are different, then it determines that the conflict occurs. The conflict judgment message sent by the conflict resolution module to the northbound configuration module includes an identification of a parameter indicating conflict, a name of an SON function module causing the conflict, and a modification value configured by the SON function module. The conflict judgment message sent by the conflict resolution module to the SON function management module includes an identification of a parameter indicating conflict, and a parameter value configured by the northbound configuration module (that is, the modification value included in the data configuration request).

Specifically, a conflict indication is carried in the conflict judgment message to represent that the conflict occurs.

If the conflict resolution module only receives the request sent by the northbound configuration module or the SON function management module a period of time; or although it receives the data configuration request sent by the northbound configuration module and also receives the parameter optimization request sent by the SON function management module, the identification of the parameter requested by the northbound configuration module to be configured and the identification of the parameter requested by the SON function management module to be configured are different; or the identifications of the parameters are same and the modification values are also same, then it determines that the conflict does not occur. Now, the conflict resolution module returns a response to the SON function management module, that is, the conflict judgment message indicating non-conflict, and then the content in the message can include the identification of the parameter. Preferably, the conflict resolution module can return a response to the northbound configuration module (that is, the conflict judgment message indicating non-conflict).

In step 204, after receiving the conflict judgment message indicating conflict sent by the conflict resolution module, the northbound configuration module performs the data configuration in the data configuration request and reports the conflict information to the superior network management.

The conflict information is the information carried in the conflict judgment message, including an identification of a parameter indicating conflict, a name of the SON function module causing the conflict, and a modification value configured by the SON function module.

If the northbound configuration module receives the conflict judgment message indicating non-conflict sent by the conflict configuration module, then it reports the data configuration result to the superior network management after performing the data configuration in the data configuration request.

In step 205, after receiving the conflict judgment message indicating conflict sent by the conflict resolution module, the SON function management module notifies the SON function module to perform parameter rollback and/or end the current self-optimization procedure.

The SON function management module notifies the SON function module to continue performing the self-optimization procedure after receiving the conflict judgment message indicating non-conflict sent by the conflict resolution module.

Specifically, for the SON function management module and the SON function module, the execution of its self-optimization may be performed by the network management or may be performed by the network element, and the implementation way also can be divided into a controlled mode and a free mode specifically.

If the self-optimization procedure is performed by a network management in the controlled mode, the SON function management module sends a notification message indicating conflict to the SON function module after receiving the conflict judgment message indicating conflict sent by the conflict resolution module, and the SON function module ends the current self-optimization procedure; the SON function management module displays the result on the SON function interface, to prompt that there is a conflict between the current optimization and the parameter configuration of the northbound configuration module; if it is performed in the free mode, then the SON function management module sends the notification indicating conflict to the SON function module after receiving the conflict judgment message indicating conflict sent by the conflict resolution module, and the SON function module performs the parameter rollback and synchronizes the parameter to the network element after finishing the parameter rollback; the SON function management module displays both the conflict and the rollback result on the SON function interface, to prompt that there is a conflict between the current self-optimization and the parameter configuration of the northbound configuration module and the parameter roll back is performed successfully; the SON function management module sends the notification indicating non-conflict to the SON function module after receiving the conflict judgment message indicating non-conflict sent by the conflict resolution module, and the SON function module continues performing the self-optimization procedure, and reports the parameter modification in the self-optimization process to the superior network management after the self-optimization is finished.

If the self-optimization procedure is performed by the network element in the controlled mode, then the SON function management module sends the notification indicating conflict to the SON function module after receiving the conflict judgment message indicating conflict sent by the conflict resolution module, the SON function module ends the current self-optimization procedure; and the SON function management module displays the result on the SON function interface, to prompt that there is a conflict between the current optimization and the parameter configuration of the northbound configuration module; and the SON function module sends a message to the network element performing the self-optimization procedure after ending the optimization procedure to notify it to end the self-optimization procedure; if it is performed in the free mode, then the SON function management module sends the notification indicating conflict to the SON function module after receiving the conflict judgment message indicating conflict sent by the conflict resolution module, and the SON function module ends the current self-optimization procedure; and the SON function management module displays the result on the SON function interface, to prompt that there is a conflict between the current optimization and the parameter configuration of the northbound configuration module; and the SON function module sends a message to the network element performing the self-optimization after ending the optimization procedure to notify it to perform the parameter rollback. If the SON function management module receives the conflict judgment message indicating non-conflict sent by the conflict resolution module, then it sends the notification indicating non-conflict to the SON function module, and the SON function module continues performing the self-optimization procedure, and sends the message to the network element to continue performing the self-optimization procedure, and reports the parameter modification in the self-optimization process to the superior network management after the self-optimization is finished.

There is no fixed sequential order in the above-mentioned step 204 and step 205.

Embodiment 3

Figure 3:
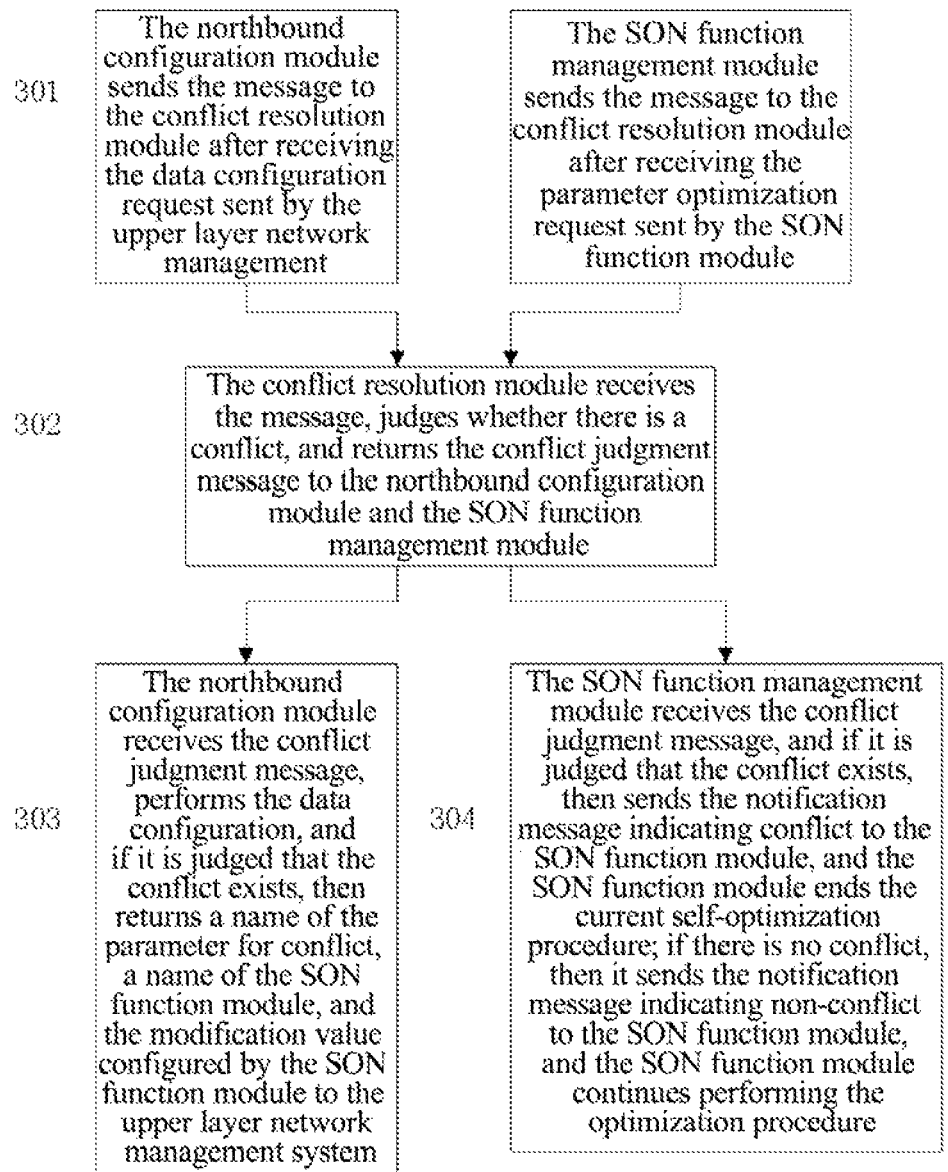
FIG. 3 is a flow chart according to embodiment 3 of the present document.

The present embodiment introduces the self-optimization (that is, parameter modification) procedure in the controlled mode performed by the network management, as shown in FIG. 3, including the following steps:

in step 301: after the northbound configuration module receives the data configuration request sent by the upper layer network management, it sends the message to the conflict resolution module, and the data configuration request message includes the parameter identification (such as a parameter name), and the modification value; the SON function management module also sends the message to the conflict resolution module after receiving the parameter optimization request sent by each specific SON function module, and the parameter optimization request message includes the parameter identification (such as a parameter name), the modification value, and the SON function module name indicating the current parameter modification.

In step 302: the conflict resolution module judges whether there is a parameter configuration conflict after receiving the message; if only the data configuration request message sent by the northbound configuration module is received or only the parameter optimization request message sent by the SON function management module is received, then it is determined that there is no conflict; if both the two messages are received, then it is determined by comparison whether there are the same parameters; if there are the same parameters and the modification values are different, then it is determined that the conflict occurs, and the conflict judgment message indicating conflict is sent to the northbound configuration module and the SON function management module respectively.

Preferably, the conflict resolution module deletes the received message after the processing is finished each time.

Preferably, if the conflict resolution module judges that the conflict does not occur, the conflict judgment message indicating non-conflict also can be sent to the northbound configuration module and the SON function management module respectively.

In step 303: after the northbound configuration module receives the conflict judgment message sent by the conflict resolution module, it modifies the parameter according to the configured parameter value in the data configuration request, and judges whether the conflict judgment message indicates there is a conflict; if the conflict exists, then the name of the SON function module causing the conflict, the modification value configured by the SON function module and the parameter identification are returned to the upper layer network management to prompt the user; if there is no conflict, then the returned result does not need to carry the above-mentioned content.

Because the conflict resolution module may also not return the response to the northbound configuration module when there is no conflict, the northbound configuration module can set a receiving timer, for example, it can start timing at the time of sending the message to the conflict resolution module; if the response of the conflict resolution module is not received during the set time, then it is determined that the conflict does not occur, and the data configuration result is returned to the superior network management.

In step 304: after the SON function management module receives the conflict judgment message sent by the conflict resolution module, it judges whether the conflict judgment message indicates that there is a conflict or not; if the conflict exists, then it sends the notification message indicating conflict to the SON function module, and the SON function module ends the current self-optimization procedure; the SON function management module displays the result on the SON function interface, to prompt the user that the parameter modification conflicts with the parameter modification caused by the northbound configuration; if there is no conflict, then it sends the notification message indicating non-conflict to the SON function module, and the SON function module continues performing the optimization procedure, and returns the result back to the SON function management module after the optimization is finished; the SON function management module displays the optimization result, and reports the parameter modification to the superior network management.

There are no limitation on the execution order of the above-mentioned steps 303 and 304, and they can also be executed simultaneously.

Embodiment 4

Figure 4:
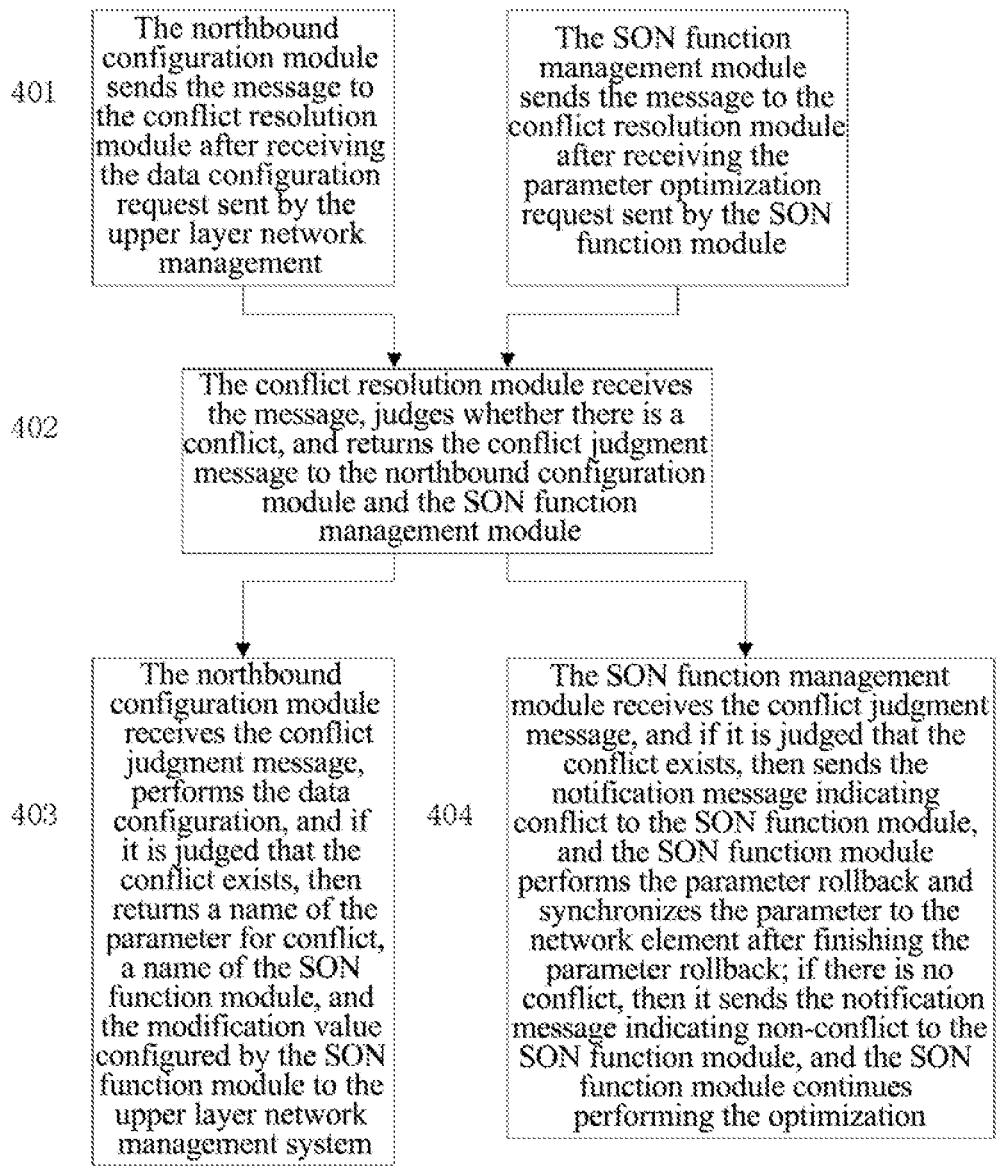
FIG. 4 is a flow chart according to embodiment 4 of the present document.

The present embodiment introduces the self-optimization procedure in the free mode performed by the network management, as shown in FIG. 4, including the following steps:

steps 401-403 are same with the steps 301-303 in embodiment 3.

In step 404, after the SON function management module receives the conflict judgment message sent by the conflict resolution module, it judges whether there is a conflict or not; if the conflict exists, then it sends the notification message indicating conflict to the SON function module, and the SON function module performs the parameter rollback and the SON function module synchronizes the parameter to the network element after finishing the parameter rollback; the SON function management module displays both the conflict and the rollback result on the SON function interface, to prompt the user that the parameter modification conflicts with the parameter modification caused by the northbound configuration and the parameter rollback is performed successfully; if there is no conflict, then it sends the notification message indicating non-conflict to the SON function module, and the SON function module continues performing the optimization, and the SON function module returns the optimization result back to the SON function management module after the optimization is finished; the SON function management module displays the result on the SON function interface and reports the caused parameter modification to the superior network management after receiving the optimization result returned by the SUN function module.

Embodiment 5

Figure 5:
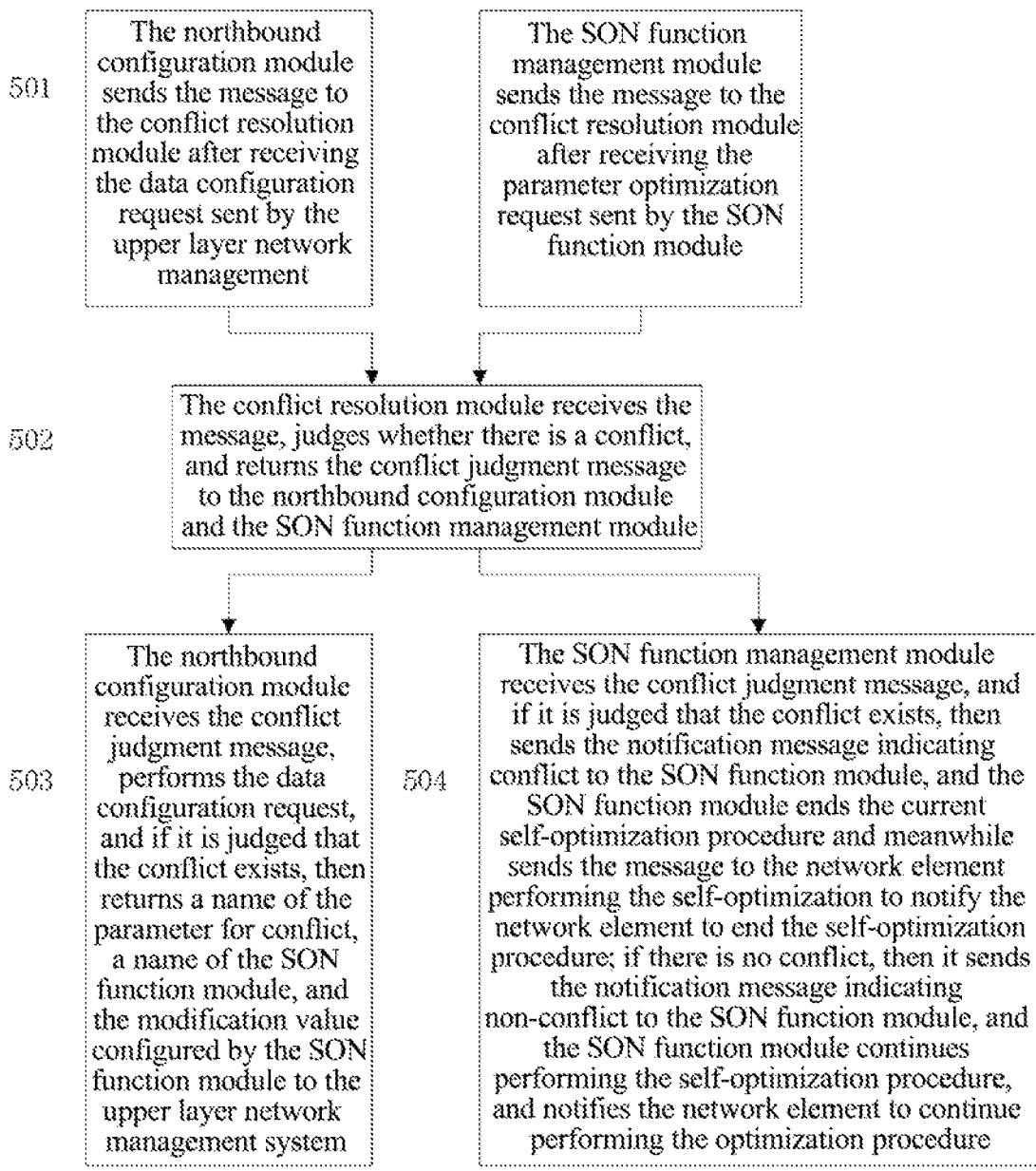
FIG. 5 is a flow chart according to embodiment 5 of the present document.

The present embodiment introduces the self-optimization procedure in the controlled mode performed by the network element, as shown in FIG. 5, including the following steps:

steps 501-503 are same with the steps 301-303 in embodiment 3.

In step 504: after the SON function management module receives the conflict judgment message sent by the conflict resolution module, it judges whether there is a conflict or not; if the conflict exists, then it sends the notification message indicating conflict to the SON function module, and the SON function module ends the current self-optimization procedure; the SON function management module displays the result on the SON function interface, to prompt the user that the parameter modification conflicts with the parameter modification caused by the northbound configuration; and the SON function module sends the message to the network element performing the self-optimization after the self-optimization procedure is finished, to notify the network element to end the self-optimization procedure; if there is no conflict, then it sends the notification message indicating non-conflict to the SON function module, and the SON function module continues performing the self-optimization procedure, and notifies the network element to continue performing the optimization procedure; and the network management (that is, the network management including the system in embodiment 1) is notified that the network element parameter is modified successfully, and the network management correspondingly finishes the update of configuration parameters and reports the result to the superior network management.

Embodiment 6

Figure 6:
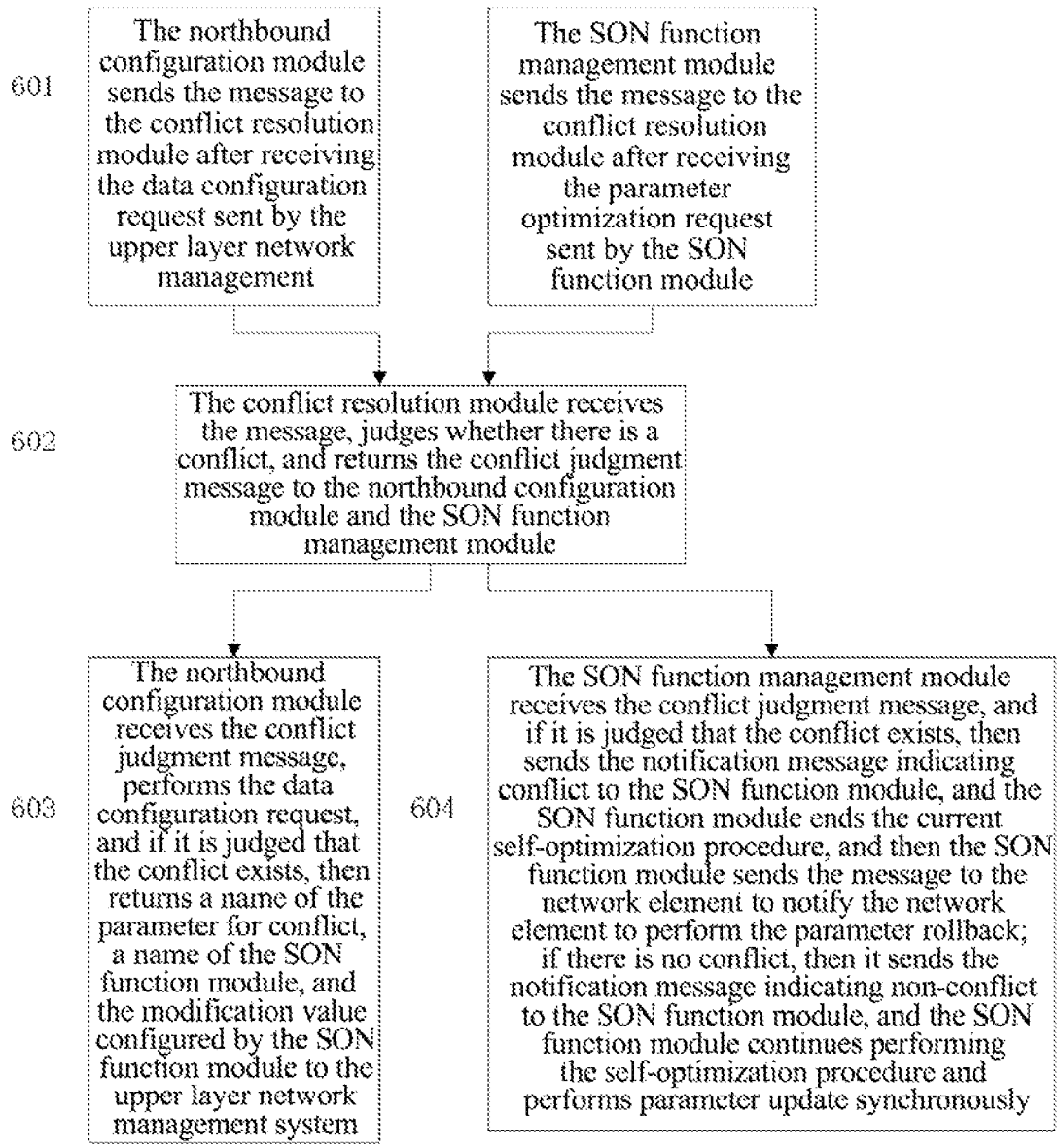
FIG. 6 is a flow chart according to embodiment 6 of the present document.

The present embodiment introduces the self-optimization procedure in the free mode performed by the network element, as shown in FIG. 6, including the following steps:

steps 601-603 are same with the steps 301-303 in embodiment 3.

In step 604, after the SON management module receives the conflict judgment message sent by the conflict resolution module, it judges whether there is a conflict or not; if the conflict exists, then it sends the notification message indicating conflict to the SON function module, and the SON function module ends the current self-optimization procedure, and then the SON function module sends the message to the network element to notify the network element to perform the parameter rollback, and the network element returns the message to the network management after the rollback is successful; the SON function management module displays the result on the interface, to prompt that there is a conflict with the configuration; and the current self-optimization procedure ends; if there is no conflict, then it sends the notification message indicating non-conflict to the SON function module, and the SON function module continues performing the self-optimization procedure and performs parameter update synchronously, and returns the update result back to the SON function management module after the update is finished; the SON function management module displays the parameter update result on the SON function interface and reports it to the superior network management.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

Obviously, the present document can have a variety of other embodiments. Those skilled in the art can make the corresponding modifications and variations according to the present document without departing from the spirit and essence of the present document. All of modifications, equivalents and/or variations without departing from the spirit and essence of the present document should be embodied in the scope of the appended claims of the present document.

INDUSTRIAL APPLICABILITY

The method and system of the present document provide the solution for the conflict between the northbound data configuration and the SON configuration; when the northbound configuration conflicts with the configuration caused by the SON function, it is subject to the northbound data, and the information, such as, a name of the parameter for the conflict, a name of the SON function, a target value of the SON function optimization, etc., is returned to the upper layer network management through the northbound interface at the same time.

What I claim is:

1. A coordinated processing method for northbound data configuration and self-organized network (SON) configuration, comprising:
   a northbound configuration module receiving a data configuration request sent by a superior network management, and sending the data configuration request to a conflict resolution module;
   an SON function management module receiving a parameter optimization request sent by an SON function module, and sending the parameter optimization request to the conflict resolution module;

the conflict resolution module receiving the data configuration request sent by the northbound configuration module and the parameter optimization request sent by the SON function management module, and if judging that a parameter requested by the northbound configuration module to be configured conflicts with a parameter requested by the SON function management module to be configured, then sending a conflict judgment message indicating conflict to the northbound configuration module and the SON function management module respectively;

after receiving the conflict judgment message indicating conflict sent by the conflict resolution module, the northbound configuration module performing data configuration in the data configuration request and reporting conflict information to the superior network management; and after receiving the conflict judgment message indicating conflict sent by the conflict resolution module, the SON function management module notifying the SON function module to perform parameter rollback and/or end a current self-optimization procedure.

2. The method according to claim 1, wherein,
the data configuration request comprises an identification of the parameter to be configured and a modification value.

3. The method according to claim 1, wherein,
the parameter optimization request comprises a name of an SON function module indicating parameter configuration, an identification of the parameter to be configured and a modification value.

4. The method according to claim 1, wherein,
the conflict resolution module judging that a parameter requested by the northbound configuration module to be configured conflicts with a parameter requested by the SON function management module to be configured, comprises:

the conflict resolution module judging that an identification of the parameter requested by the northbound configuration module to be configured and an identification of the parameter requested by the SON function management module to be configured are same while modification values are different, then judging that the conflict occurs.

5. The method according to claim 1, wherein,
the conflict judgment message sent by the conflict resolution module to the northbound configuration module comprises an identification of a parameter indicating conflict, a name of an SON function module causing the conflict, and a modification value configured by the SON function module.

6. The method according to claim 1, wherein,
the conflict judgment message sent by the conflict resolution module to the SON function management module comprises an identification of a parameter indicating conflict, and a parameter value configured by the northbound configuration module.

7. The method according to claim 1, wherein,
after receiving the conflict judgment message sent by the conflict resolution module, the SON function management module notifying the SON function module to perform parameter rollback and/or end a current self-optimization procedure, comprises:

for a self-optimization procedure in a controlled mode performed by a network management, the SON function management module sending a notification indicating conflict to the SON function module after receiving the conflict judgment message indicating conflict sent by the conflict resolution module, and the SON function module ending the current self-optimization procedure; or for a self-optimization procedure in a free mode performed by a network management, the SON function management module sending a notification indicating conflict to the SON function module after receiving the conflict judgment message indicating conflict sent by the conflict resolution module, and the SON function module performing the parameter rollback and synchronizing the parameter to a network element after finishing the parameter rollback; or for a self-optimization procedure in a controlled mode performed by a network element, the SON function management module sending a notification indicating conflict to the SON function module after receiving the conflict judgment message indicating conflict sent by the conflict resolution module, and the SON function module ending the current self-optimization procedure and notifying the network element performing the self-optimization procedure to end the current self-optimization procedure; or for a self-optimization procedure in a free mode performed by a network element, the SON function management module sending a notification indicating conflict to the SON function module after receiving the conflict judgment message indicating conflict sent by the conflict resolution module, and the SON function module ending the current self-optimization procedure and notifying the network element performing the self-optimization procedure to perform the parameter rollback.

8. The method according to claim 1, wherein,
the method further comprises:
the conflict resolution module receiving the data configuration request sent by the northbound configuration module and the parameter optimization request sent by the SON function management module, and if judging that the parameter requested by the northbound configuration module to be configured does not conflict with the parameter requested by the SON function management module to be configured, then sending a conflict judgment message indicating non-conflict to the SON function management module; and the SON function management module sending a notification indicating non-conflict to the SON function module after receiving the conflict judgment message indicating non-conflict sent by the conflict resolution module, and the SON function module continuing performing the self-optimization procedure.

9. A coordinated processing system for northbound data configuration and self-organized network (SON) configuration, comprising a northbound configuration module, an SON function module, an SON function management module, and a conflict resolution module, wherein, the northbound configuration module is configured to receive a data configuration request sent by a superior network management and send the data configuration request to the conflict resolution module; and after receiving a conflict judgment message indicating conflict sent by the conflict resolution module, perform data configuration in the data configuration request and report conflict information to the superior network management;

the SON function module is configured to send a parameter optimization request to the SON function management module, and perform parameter rollback and/or end a current self-optimization based on a notification of the SON function management module;

the SON function management module is configured to receive the parameter optimization request sent by the SON function module and send the parameter optimization request to the conflict resolution module; and after receiving the conflict judgment message indicating conflict sent by the conflict resolution module, notify the SON function module to perform the parameter rollback and/or end a current self-optimization procedure;

the conflict resolution module is configured to receive the data configuration request sent by the northbound configuration module and the parameter optimization request sent by the SON function management module, and if judging that a parameter requested by the northbound configuration module to be configured conflicts with a parameter requested by the SON function management module to be configured, then send the conflict judgment message indicating conflict to the northbound configuration module and the SON function management module respectively.

10. The system according to claim 9, wherein,
the data configuration request comprises an identification of the parameter to be configured and a modification value.

11. The system according to claim 9, wherein,
the parameter optimization request comprises a name of an SON function module indicating parameter configuration, an identification of the parameter to be configured and a modification value.

12. The system according to claim 9, wherein,
the conflict resolution module is configured to judge that a parameter requested by the northbound configuration module to be configured conflicts with a parameter requested by the SON function management module to be configured by means of:
the conflict resolution module judging that an identification of the parameter requested by the northbound configuration module to be configured and an identification of the parameter requested by the SON function management module to be configured are same while modification values are different, then determining that the conflict occurs.

13. The system according to claim 9, wherein,
the conflict judgment message sent by the conflict resolution module to the northbound configuration module comprises an identification of a parameter indicating conflict, a name of an SON function module causing the conflict, and a modification value configured by the SON function module.

14. The system according to claim 9, wherein,
the conflict judgment message sent by the conflict resolution module to the SON function management module comprises an identification of a parameter indicating conflict, and a parameter value configured by the northbound configuration module.

15. The system according to claim 9, wherein,
the SON function management module is configured to: notify the SON function module to perform the parameter rollback and/or end the current self-optimization procedure after receiving the conflict judgment message indicating conflict sent by the conflict resolution module by means of:
for a self-optimization procedure in a controlled mode performed by a network management, or a self-optimization procedure in a free mode performed by the network management, or a self-optimization procedure in a controlled mode performed by a network element, or a self-optimization procedure in a free mode performed by the network element, the SON function management module sending a notification indicating conflict to the SON function module after receiving the conflict judgment message indicating conflict sent by the conflict resolution module;

the SON function module is configured to: perform the parameter rollback and/or end the current self-optimization based on the notification of the SON function management module by means of:
for the self-optimization procedure in the controlled mode performed by the network management, the SON function module ending the current self-optimization procedure after receiving the notification indicating conflict sent by the SON function management module; or
for the self-optimization procedure in the free mode performed by the network management, the SON function management module performing the parameter rollback and synchronizing the parameter to the network element after receiving the notification indicating conflict sent by the SON function management module; or
for the self-optimization procedure in the controlled mode performed by the network element, after receiving the notification indicating conflict sent by the SON function management module the SON function module ending the current self-optimization procedure, sending a message to a network element performing the self-optimization to notify the network element to end the self-optimization procedure; or
for the self-optimization procedure in the free mode performed by the network element, after receiving the notification indicating conflict sent by the SON function management module the SON function module ending the current self-optimization procedure, sending a message to a network element performing the self-optimization to notify the network element to perform the parameter rollback.

16. The system according to claim 9, wherein,
the conflict resolution module is further configured to send a conflict judgment message indicating non-conflict to the SON function management module if judging that the parameter requested by the northbound configuration module to be configured does not conflict with the parameter requested by the SON function management module to be configured;
the SON function management module is further configured to send a notification indicating non-conflict to the SON function module after receiving the conflict judgment message indicating non-conflict sent by the conflict resolution module; and
the SON function module is further configured to continue performing the self-optimization procedure after receiving the notification indicating non-conflict sent by the SON function management module.

17. The method according to claim 2, wherein,
the conflict resolution module judging that a parameter requested by the northbound configuration module to be configured conflicts with a parameter requested by the SON function management module to be configured, comprises:
the conflict resolution module judging that an identification of the parameter requested by the northbound configuration module to be configured and an identification of the parameter requested by the SON function management module to be configured are same while modification values are different, then judging that the conflict occurs.

18. The method according to claim 3, wherein, the conflict resolution module judging that a parameter requested by the northbound configuration module to be configured conflicts with a parameter requested by the SON function management module to be configured, comprises:

the conflict resolution module judging that an identification of the parameter requested by the northbound configuration module to be configured and an identification of the parameter requested by the SON function management module to be configured are same while modification values are different, then judging that the conflict occurs.

19. The system according to claim 11, wherein, the conflict judgment message sent by the conflict resolution module to the northbound configuration module comprises an identification of a parameter indicating conflict, a name of an SON function module causing the conflict, and a modification value configured by the SON function module.

20. The system according to claim 11, wherein, the conflict judgment message sent by the conflict resolution module to the SON function management module comprises an identification of a parameter indicating conflict, and a parameter value configured by the northbound configuration module.

* * * * *